H. V. WELCH.
PROCESS FOR MANUFACTURE OF SULFURIC AND HYDROCHLORIC ACIDS.
APPLICATION FILED MAY 10, 1917.
1,285,856. Patented Nov. 26, 1918.
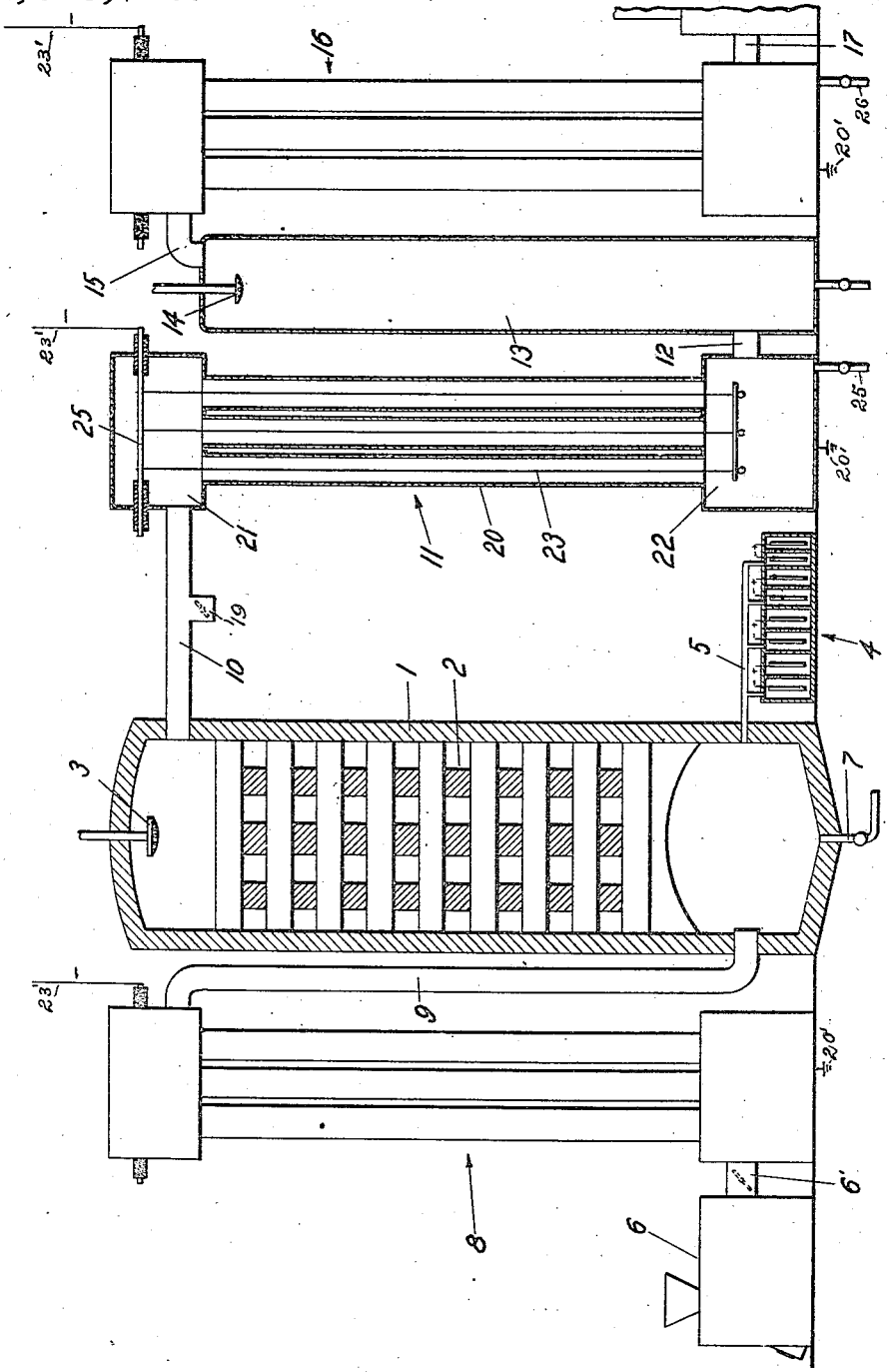
Inventor:
Harry V. Welch
by Arthur P. Knight
his Attorney

UNITED STATES PATENT OFFICE.

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS FOR MANUFACTURE OF SULFURIC AND HYDROCHLORIC ACIDS.

1,285,856.   Specification of Letters Patent.   Patented Nov. 26, 1918.

Application filed May 10, 1917. Serial No. 167,730.

*To all whom it may concern:*

Be it known that I, HARRY V. WELCH, a citizen of the United States, residing at Los Angeles, in the county of Los Angeles, State of California, have invented a new and useful Process for Manufacture of Sulfuric and Hydrochloric Acids, of which the following is a specification.

This invention relates to the manufacture of sulfuric acid simultaneously with hydrochloric acid, and preferably in such a manner as to provide for the simultaneous production of caustic soda.

In the manufacture of caustic soda by electrolytic process, large amounts of chlorin are produced, and the utilization of same, for example, in the formation of bleaching powder, is not always practicable. One of the main objects of the present invention is to provide for the successful commercial utilization of the surplus chlorin that is produced as a by-product in the caustic soda manufacture. Another object of the invention is the production of sulfuric acid of high concentration in an extremely economical manner. This is accomplished by utilizing as an oxidizing agent for sulfur dioxid, chlorin produced, for example, as a by-product, as above referred to, together with water or dilute hydrochloric acid, resulting in the simultaneous production of sulfuric and hydrochloric acids. This reaction is well known, but certain difficulties have heretofore been encountered in successful commercial use of the same, on account of the difficulty of separating the sulfuric and hydrochloric acids produced in the process.

This has hitherto been effected by employing a reaction tower filled with stones, into which enter pyrites burner gases and chlorin and which is fed with only so much water as corresponds to the formation of gaseous HCl and sulfuric acid of 65 to 80% strength. If the reacting materials are supplied continually in just the right proportion, it is theoretically possible, under these conditions, to produce a liquid solution of sulfuric acid and to retain all of the hydrochloric acid in a gaseous state so that the latter will pass from the tower free from sulfuric acid. In practice, however, on account of unavoidable variations in the proportions, and on account of the irregular currents of gas through the apparatus, there is a tendency for sulfur dioxid and chlorin to pass unchanged from the tower and get into the condensers for the hydrochloric acid and to there form sulfuric acid, which contaminates the hydrochloric acid. This has, in some cases, been avoided by working with an excess of chlorin, but this is obviously undesirable, if it can be avoided.

My process provides for effective separation of the sulfuric acid from the hydrochloric acid by subjecting the gases and vapors, containing the products of the above described reaction, to a precipitating operation, preferably by electrical precipitation, in such manner, and at such temperatures that substantially all of the sulfuric acid is precipitated and removed in liquid form, and the hydrochloric acid gas is then utilized in any suitable manner, for example, it may be subsequently cooled and brought in contact with water to form liquid solution of hydrochloric acid.

The accompanying drawing illustrates an apparatus suitable for carrying out my invention, said drawing being a side elevation of such apparatus, partly in section.

Referring to the drawing, 1 indicates a reaction chamber which may be formed as a tower containing checker work or equivalent means indicated at 2, and provided at its upper portion with a spray or other means 3 for supplying water or dilute hydrochloric acid to the chamber. Said chamber 1 may be provided at its lower end with means 7 for drawing off sulfuric acid therefrom. Chlorin is supplied to the chamber 1 from a suitable source—for example, an electrolytic plant indicated at 4, and adapted to electrolyze sodium chlorid for the production of sodium hydroxid and chlorin, the chlorin passing off through conduit 5 to the lower part of chamber 1. Suitable means indicated at 6 are also provided for furnishing sulfur dioxid, said means 6 being, for example, a sulfur burner or pyrites roaster. The outlet pipe 6' of said means 6 may be connected to an electrical precipitator indicated at 8, the outlet of which is connected by a pipe 9 to the lower part of the reaction chamber 1, the purpose of this electrical precipitator being to remove from the gaseous products of combustion, any dust or other suspended matter.

Pipe 10 leads from the upper part of the chamber 1 to an electrical precipitator indicated at 11, from which pipe 12 leads to a cooler and humidifier 13, provided with means 14 for spraying water or dilute hydrochloric acid thereinto. Pipe 10 may be provided with an inlet valve 19 for admitting cold air thereto. An outlet pipe 15 leads from chamber 13 to an electrical precipitator 16, whose outlet pipe 17 may be connected to a stack or other means for carrying off the residual gases. It will be understood that either natural draft or forced draft may be used to maintain flow of the gases through the system above described.

The electrical precipitators above referred to may be of any suitable construction, comprising, for example, vertical tubes or flues 20, serving as collecting electrodes, and connected to headers 21 and 22 at their upper and lower ends, for distributing gases thereto and discharge electrodes 23 hung axially in said flues from insulated support 25. High tension electric current is supplied through wires 23' to the said electrodes 23, said current being either direct or alternating—for example, in case of direct current, the means for supplying the same may be substantially as described in a patent to F. G. Cottrell—No. 895,729. Electrodes or flues 20 are preferably grounded as indicated at 20'. The various parts of the apparatus, including the reaction chamber, the electrical precipitators and the cooling humidifying chamber, may be of any suitable material, being, for example, where necessary, made of or lined with acid resistant material so as to withstand the corrosive action of any acid that may be present.

My process may be carried out in the above described apparatus as follows:—

The sulfur dioxid produced in burner 6 passes along with the other products of combustion, and with air through pipe 6', to electrical precipitator 8, wherein it is subjected to the action of the electrical field in such manner as to precipitate any dust or other suspended material carried over from the burner, so that the sulfur dioxid entering the reaction chamber through pipe 9 is in a clean condition. The gases carrying sulfur dioxid entering through pipe 9 and chlorin entering through pipe 5 pass upwardly in chamber 1 in contact with water sprayed or supplied through means 3 and running over the checker work 2, and in this operation, the sulfur dioxid, chlorin and water react to form sulfuric acid and hydrochloric acid, sufficient water being supplied—for example, to produce a sulfuric acid of 65 to 80% strength, or for other definite strength required, and the temperature within the chamber 1 being maintained above, say 230° C. The chlorin is furnished, preferably in as nearly as possible the proportion required for the above stated reaction, no excess of chlorin being required in this case.

The process is preferably so carried out that a large proportion of the sulfuric acid produced passes over in vapor form along with the hydrochloric acid gas, the temperature within the chamber 1 being sufficient to maintain the sulfuric acid or a considerable proportion thereof in the form of a vapor. In passing to the precipitating means 11, the gases and vapors may be cooled—for example, by admission of cold air through valve 19 to pipe 10 in such manner as to maintain the temperature of the gas within the precipitator at or about say 150° to 230°, according to the strength of the acid produced, so that substantially all of the sulfuric acid present in the precipitator will be in a condensed form, mainly as fume. This fume of sulfuric acid is precipitated by electrical action in said treater and runs down the collecting means to the bottom of said precipitator, from which it is drawn off through suitable means indicated at 25. The hydrochloric acid gas, together with any other gases that may be present, passes through the outlet pipe 12 to suitable means for utilizing such hydrochloric acid—for example, through the cooler and humidifier 13, wherein said gas is brought in contact with water so as to form a solution of hydrochloric acid, forming a fume or mist which is precipitated in precipitator 16, and may be drawn off from said precipitator by suitable means 26. The acid so formed may be dilute and in that case, it may be returned to the reaction chamber for reaction of the water therein with a further quantity of $SO_2$ and Cl. Either of the condensing actions above referred to may be effected by external cooling of the chambers or flues through which the gases and vapors are passing, or by admission of a cooling medium into such chambers or flues, and such cooling either by external or internal action, may take place either in separate cooling means or in the precipitating chambers themselves. The water required for formation of the respective acids in liquid form may be added in such cooling or may be present in the vapors and condensed along with the respective acids. The presence of water vapor in sufficient amount for this purpose may be provided for by adding water or steam in the reaction chamber or at any stage of the process.

In carrying out my process as above described, more or less sulfuric acid is generally produced as liquid sulfuric acid of definite strength, in addition to the sulfuric acid passing off as vapor, such liquid sulfuric acid being collected in the reaction chamber and being drawn off through outlet means 7.

The condensation of the products of the reaction may be effected in any desired number of stages. For example, the initial condensation, after leaving the reaction chamber, may be at such temperatures, as to produce a mist consisting of sulfuric acid of high concentration—say, 95 per cent. strength, and free from hydrochloric acid; the next condensation being at such temperature as to produce dilute sulfuric acid together with some hydrochloric acid; the next condensation being at such temperature as to produce hydrochloric acid free from sulfuric acid in one or more stages; the mist formed at each condensation being precipitated or collected, preferably by electrical precipitation. In each of these condensing operations the cooling may be effected by exterior cooling of the chambers through which the gases and vapors are flowing, or by admission of a cooling medium such as air or water, and the water required for formation of the respective liquid acids in such condensation may be added in such cooling or may be present in the vapors and condensed therefrom. The mixture of dilute sulfuric acid and hydrochloric acid produced as above described, may be returned to the reaction chamber to furnish water for the reaction, the said acids then passing along with the fresh reaction products, and the dilute hydrochloric acid produced in the last stage may be returned either to the reaction chamber or to the third stage of condensation.

The chlorin required for the process above described may be derived from any suitable source. For example, a part of the chlorin may be produced from the hydrochloric acid which constitutes one of the products of the reaction. In such case, part or all of the hydrochloric acid produced may be treated according to the Welden process, to produce chlorin, which is returned to the reaction chamber. Or, after precipitation of substantially all of the sulfric acid from the gas, the latter, containing dry hydrochloric acid, may be mixed with air, heated and passed to a catalytic chamber, where it is decomposed by the action of a suitable catalyzing agent, such as cupric chlorid. The process is, therefore, capable of being so carried out as to produce sulfuric acid as the main product, and if desired, only sufficient chlorin need be furnished from an extraneous source to make up for unavoidable losses in cyclic operation of the process, or more or less hydrochloric acid may be withdrawn from the cycle, as a by-product, according to the local demand there may be for such acid.

The process above described may also be carried out in such manner that all or part of the sulfuric acid and hydrochloric acid produced in the stated reaction, form a liquid mixture which may then be separated into its constituents by converting all of the liquid to the form of vapor by the action of heat, and then cooling the vapor mixture to condense the sulfuric and hydrochloric acids in successive stages, as set forth in my application, Ser. No. 167,731, filed May 10, 1917. Or, such mixed liquid may be sprayed into a body of gas at such temperature as to volatilize the hydrochloric acid and leave a cloud of sulfuric acid particles of chemical concentration, the hydrochloric acid being then recovered or utilized in any suitable manner.

What I claim is:

1. The process of making sulfuric acid, which consists in causing sulfur dioxid, chlorin and water vapor to react at such temperature, as to produce sulfuric acid in vapor form, together with hydrochloric acid gas, cooling the resulting gas and vapor to such temperature as to cause substantially all the sulfuric acid to condense as sulfuric acid of a definite concentration, according to the temperature of condensation, in the form of finely divided suspended particles, while substantially all the hydrochloric acid remains in gaseous form, and precipitating the sulfuric acid so condensed to separate it from the hydrochloric acid.

2. The process according to claim 1, wherein the precipitation is effected by the action of an electrical field.

3. The process which consists in causing sulfur dioxid, chlorin and water to react under such conditions as to produce liquid sulfuric acid of definite strength, together with sulfuric acid in vapor form and with water vapor and hydrochloric acid gas, cooling the resulting gases and vapors to such temperature as to condense, in the form of mist, sulfuric acid of strength corresponding to such temperature, and then precipitating such mist, by electrical action.

4. The process of making sulfuric acid, which consists in burning sulfur bearing material to form sulfur dioxid, precipitating dust from the resulting gases, causing said gases to react with chlorin and water vapor to form sulfuric and hydrochloric acids, cooling the resulting gases and vapors to such temperature as to form sulfuric acid of definite strength and hydrochloric acid gas, and separating such sulfuric acid from said hydrochloric acid gas.

5. The process of producing sulfuric acid which consists in bringing sulfur dioxid in contact with chlorin and water vapor to form sulfuric acid and hydrochloric acid gas, maintaining the said reacting substance at such temperature as to produce sulfuric acid vapor, together with hydrochloric acid gas, cooling the resulting gas and vapor to condense sulfuric acid of definite strength, in the form of finely divided suspended particles, precipitating the said particles so as to remove the sulfuric acid and causing the hydrochloric acid gas so produced to react with a suitable reagent to produce chlorin, and utilizing such chlorin together with chlorin from an extraneous source in cyclic repetition of the process.

6. The process which consists in causing reaction of sulfur dioxid, chlorin and water, and bringing the resulting products to such temperature that the hydrochloric acid will be in the form of vapor and the sulfuric acid will be in the form of suspended particles and then precipitating such suspended particles.

In testimony whereof I have hereunto set my hand, at Los Angeles, California, this 5th day of May, 1917.

HARRY V. WELCH.